March 30, 1965 E. L. REIBOLD ET AL 3,175,694
FLATWARE DISPLAY EQUIPMENT
Filed May 1, 1963 2 Sheets-Sheet 1
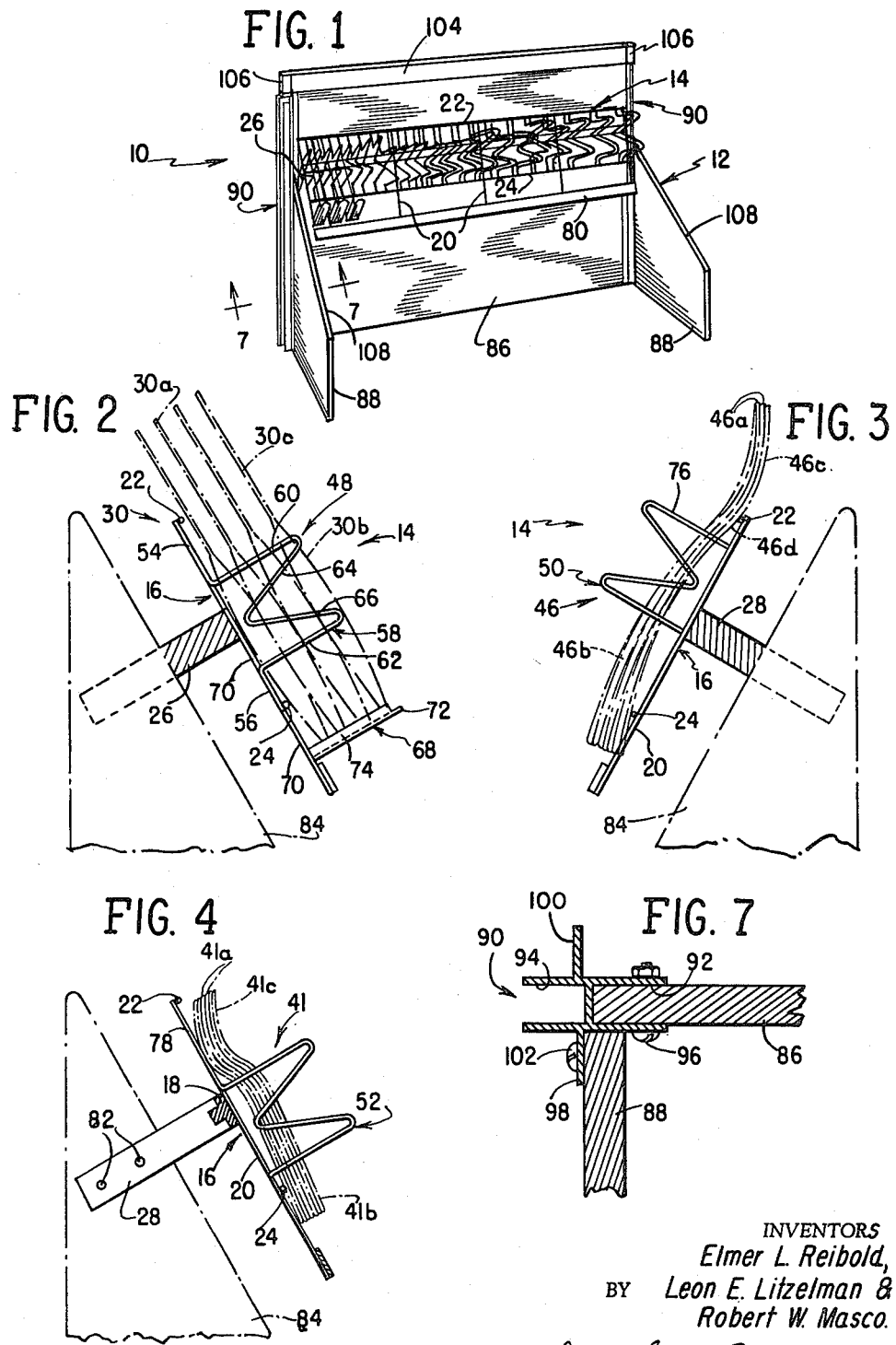
INVENTORS
Elmer L. Reibold,
BY Leon E. Litzelman &
Robert W. Masco.
John S. O'Brien ATTY.

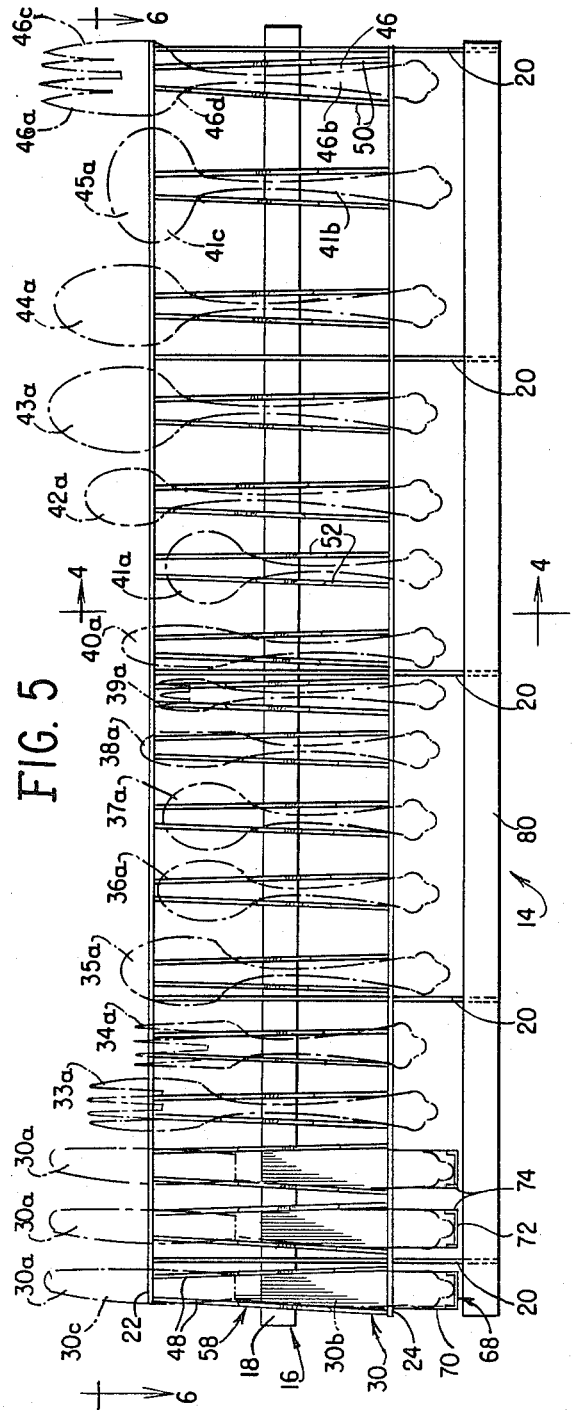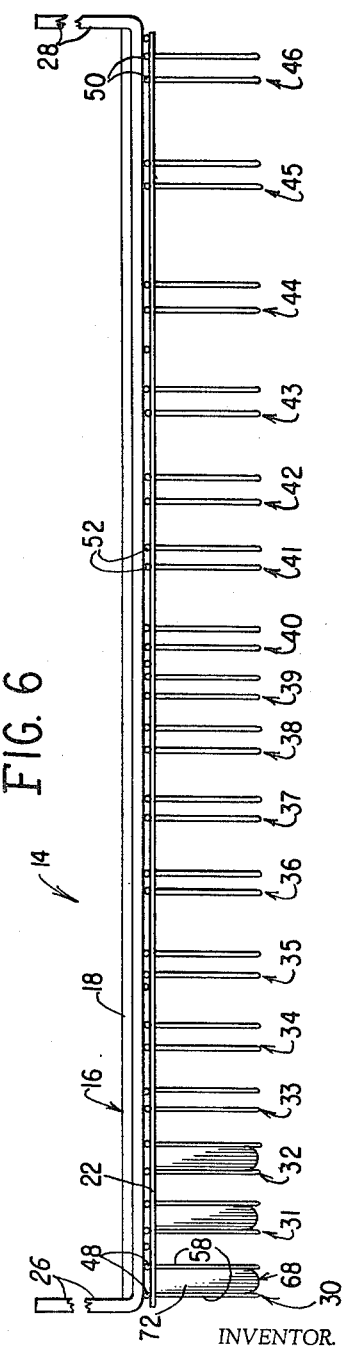

United States Patent Office 3,175,694
Patented Mar. 30, 1965

3,175,694
FLATWARE DISPLAY EQUIPMENT
Elmer L. Reibold, Park Ridge, Leon E. Litzelman, Naperville, and Robert W. Masco, Chicago, Ill., assignors to Oneida Ltd., Oneida, N.Y., a corporation of New York
Filed May 1, 1963, Ser. No. 277,197
4 Claims. (Cl. 211—60)

This invention relates to equipment for displaying flatware, and particularly, to equipment for displaying a set of flatware such as silverware and the like, with a quantity of each item of the set on display.

Flat tableware, such as knives, forks, spoons and other table utensils, is conventionally displayed to prospective purchasers in sets representing service for a given number of persons, or more or less in bulk as in the case of open stock. Set displays may be arranged attractively but are not conducive to sales of individual pieces. Bulk displays stimulate sales of individual pieces but are frequently lacking in the attractiveness desired for greatest sales appeal. Combinations of set displays with bulk displays have also not achieved the desired sales appeal.

An important object of the present invention is to provide flatware displays than stimulate sales by presenting the flatware in a manner which combines the advantages of set and bulk displays, achieving display attractiveness and stimulating both set and open stock purchases.

A more particular object is to provide a device for attractively displaying flatware in sets, as completely as desired, with a quantity of each piece on display, thus fostering the sale both of sets and of individual pieces.

Another important object is to provide a display device which projects flatware out to the viewer, creating visual impact and affording full viewing from various directions. A related object is to provide a display device which features the flatware while reducing the prominence of its mounting.

A further object is to provide a display device which is conveniently accessible to the prospective purchaser for viewing and for removal and replacement of individual pieces.

Another object is to provide a display device which continues to present an attractive display of flatware despite repeated handling of the articles on display.

An additional object is to provide a display device which may be mounted in any convenient location, especially on a counter top or the like, and which may be attractively arranged with companion displays.

A further object is to provide a display unit or fixture embodying such a device, which is especially well suited for counter top displays, and which may be employed as a display module.

Other objects include the provision of simple, economical, functional and versatile display equipment accomplishing the foregoing objects.

These and other objects, advantages, and functions of the invention will be apparent on reference to the specification and to the attached drawings, wherein like parts are identified by like reference symbols in each of the views, and wherein:

FIGURE 1 is a perspective view of a preferred embodiment of a flatware display unit or module according to the invention;

FIGS. 2 and 3 are, respectively, enlarged left and right side elevational views of a preferred display device employed in the display unit, illustrating in phantom lines pieces of flatware stacked in holders;

FIG. 4 is a sectional view of the device, taken on line 4—4 of FIG. 5, illustrating in phantom lines a stack of pieces in a holder;

FIG. 5 is a front elevational view of the device, illustrating in phantom lines a set of flatware on display;

FIG. 6 is an end elevational view of the device, taken on line 6—6 of FIG. 5; and FIG. 7 is an enlarged fragmentary sectional view of a display stand, taken on line 7—7 of FIG. 1.

The invention provides flatware display equipment including a plurality of holders disposed in spaced apart side-by-side relation. Each of the holders includes a pair of side brackets spaced apart for receiving a single piece of flatware transversely therebetween. The brackets extend outwardly for receiving a stack of like pieces of flatware therebetween. A complete or partial set of flatware may be displayed by the holders, and they are preferably staggered with respect to each other for accommodating the different sizes of the pieces and thereby providing an attractive set display. The preferred embodiments include legs for mounting the holders on a base, preferably in a manner which projects the holders and the articles on display outwardly from the base.

Referring to the drawings, a preferred form of display unit or module 10 is illustrated in FIG. 1. The unit includes a display stand 12 and a flatware display device or rack 14. This view illustrates one manner of mounting the display device to provide a counter top display, and the display device may be mounted and arranged in various alternative ways.

Referring to FIGS. 2–6, the display device 14 includes a generally flat frame 16 constructed of a reinforced mounting bar 18 extending transversely on the device, a plurality of spaced parallel cross rods 20 mounted on the bar and extending perpendicularly thereto, and a pair of spaced parallel rear and front holder mounting rods 22 and 24 secured in a common plane to the cross rods perpendicularly thereto and parallel to the mounting bar. In the preferred illustrative embodiment, the mounting bar 18 is a rigid metal bar, and the rods 20, 22, and 24 are rigid wire rods. The bar and the rods are secured together by suitable means such as welding. Two spaced parallel legs 26 and 28 are integral with the bar 18 and its opposite ends and extend perpendicularly inwardly therefrom.

A plurality of holders 30–46 for individual articles, pieces or items of flatware is mounted on the frame 16 in spaced apart side-by-side relation in a row extending between the opposite ends of the mounting bar 18 and of the frame. Each of the holders is constructed of a pair of spaced apart substantially identical bent wire holder rods, three of which are illustrated respectively in FIGS. 2–4. Thus, the holder 30 on the left-hand end of the device as viewed in FIGS. 5 and 6 is constructed of two substantially identical rods 48. Similarly, the right-hand holder 46 is constructed of two substantially identical rods 50. One of the intermediate holders 41 is constructed of two substantially identical rods 52.

Referring to FIG. 2 as illustrative, each holder rod 48 is bent from a straight rod and includes two opposite end portions 54 and 56 aligned as in the straight rod. A bracket portion or bracket 58 is bent outwardly from the rod and has opposite ends integral with the respective inner ends of the end portions 54 and 56. The bracket portion includes two parallel opposite end sections 60 and 62 which extend perpendicularly outwardly from the rod end portions 54 and 56 integral therewith. The end sections 60 and 62 are bent towards each other and inwardly to provide convergent joined sections 64 and 66 imparting a V-shaped configuration to the center of the bracket portion 58. The outer ends of the end portions 54 and 56 are secured to the mounting rods 22 and 24, so that the bracket portion 58 extends perpendicularly outwardly from the frame 16 with the end sections perpendicular to the plane of the mounting rods. The rods 48 in the holder 30 are spaced apart for receiving a single piece of flatware transversely between the bracket portions 58, and they are slightly divergent from the rear mounting rod 22 to the front mounting rod 24 (see FIG. 5). The bracket portions 58 extend for a distance selected to hold a desired number of like pieces in a single stack therebetween. The remaining holders 31–46 are similarly constructed of pairs of identical bent rods, with variations in arrangement for holding different pieces of flatware, as described subsequently.

The first three holders 30–32 are intended for displaying dinner knives 30a, and the holders are the same. A single stack of knives is supported between the bracket portions 58 in each of the holders, with the knife handles 30b disposed between the bracket portions and the opposite ends of the knives extending therefrom. The knife blades 30c extend rearwardly, over the rear mounting rod 22, and the knife handle ends extend forwardly, over the front mounting rod 24. The display is arranged in this manner for viewing the pieces as they would appear in a table setting.

It is preferred that the display device 14 and the frame 16 thereof be displayed at an inclination to the horizontal, such as illustrated in FIGS. 1–4, for enhanced visibility and attractiveness. The knives 30a are held and their handle ends are aligned by a retainer 68 extending across each of the holders 30–32, between the bracket portions 58 thereof. The retainer is constructed of a bar bent to provide a mounting strip 70 (FIG. 2) paralleling the frame 16, a retaining end strip 72 extending perpendicularly outwardly therefrom, and retaining side strips 74 on opposite sides of the end strip and forming a channel therewith facing the bracket portions 58. The mounting strip 70 is secured to the mounting bar 18 and to the front mounting rod 24. The retainer end strip 72 abuttingly engages the free ends of the knife handles for gravity alignment of the knives in each stack with their functional ends uppermost. In this manner, a quantity of knives may be neatly and attractively displayed, whereas previously, knives were commonly mounted separately and individually in various ways. Either hollow or solid handle knives may be displayed in the same manner, the device holding a greater number of the latter.

The contours and symmetry of dinner knives render it preferable to employ the retainers 68 for aligning them properly, and the alignment is maintained as different patterns or styles are displayed. The remaining pieces of the dinnerware sets most frequently used, especially the several types of spoons and forks, have relatively abruptly changing widths where the handle is joined to the functional end of the utensil. The holder rods in each of the holders 33–46 are spaced apart at the rear ends of their bracket portions, nearer the rear mounting rod 22, so that the enlarged portions or shoulders of the utensils are seated or abut on the ends of the bracket portions for gravity alignment of the stacked pieces. For example, as seen in FIGS. 3 and 5, cold meat forks 46a include the usual relatively wide pronged functional end 46c joined to a narrow handle 46b at a tapering shoulder 46d. The shoulder of each piece is seated on the outer surfaces of the rear end sections 76 of the bracket portions in the holder rods 50. The remaining utensils are aligned in stacks in their respective holders 33–45 in the same manner.

It will be seen on comparison of FIGS. 2–4 that the bracket portions of the holder rods 48, 50 and 52, such as indicated at 58 in FIG. 2, are staggered with respect to each other, from front to rear on the device. The relationship of other bracket portions will be seen on reference to FIGS. 1 and 5. This arrangement provides for the different sizes and contours of the several pieces flatware, enabling them to be displayed most attractively in a set. While the illustrative arrangement is preferred, it will be apparent that other arrangements may be made, and the display device may accommodate a greater or lesser number of different pieces. Otherwise, the holder rods are substantially similar.

Referring to FIGS. 2–5, one or both of the mounting rods 22 and 24 support the ends of the pieces disposed in the holders. Depending on their balance and the frame mounting angle, the knives 30a may be supported by the front mounting rod 24 or by both of the mounting rods 22 and 24. Depending upon their length, other pieces are supported on the front rod 24 or on both the rear and front rods 22 and 24. FIG. 3 illustrates forks 46a supported on both rods. Other examples of pieces supported in this manner include, as seen in FIG. 5, the butter spreaders 38a, the iced drink spoons 42a, the serving spoons 43a and 44a, and the gravy ladle 45a. Other pieces are supported by the front rod 24 and the rear end portions of the holder rods. FIG. 4 illustrates sugar spoons 41a supported in this manner, with the functional end 41c of the bottom article seated on the rear end portions 78 of the holder rods 52, and the handle 41b of the bottom article seated on the front mounting rod 24. Other articles supported in the same or similar manner, seen on reference to FIG. 5, include dinner forks 33a, salad forks 34a, soup spoons 35a, teaspoons 36a, cocktail forks 39a, and butter knives 40a.

The holders 30–46 and the end support means for the pieces serve to cradle stacks of pieces between the bracket portions of the several holders, with the opposite ends of the pieces extending therefrom. The open and outwardly extending mounting afforded by the device renders the different pieces completely visible or substantially so from various directions. The pieces are stacked neatly in each holder and are readily removed for examination and replaced. When the pieces are returned to the holders, they seat themselves properly in neat stacks, to preserve the appearance of the display.

The cross rods 20 extend forwardly beyond the front mounting rod 24, to provide supports for an identification bar 80. The identification bar extends transversely in parallel to the mounting bar 18 and forwardly of the handle ends of the flatware. The bar is provided with suitable indicia, not shown, opposite the respective pieces, for identifying the pieces and providing price information if desired.

The supporting legs 26 and 28 are employed for mounting the display device 14 in any desirable location, and for this purpose the legs may be provided with mounting openings 82, as seen in FIG. 4. The device may be mounted at diverse angles on counter tops, between partitions, and on various supports. In FIGS. 2–4, the upper portions of partitions 84 are illustrated, and the legs may be secured to the sides thereof and projecting outwardly therefrom.

FIGS. 1 and 7 illustrate a preferred form of display unit 10 which includes the device 14 mounted on the stand 12, and is especially well suited for counter top displays, being employed either alone or as one module of a group of aligned units. The display stand 12 includes a normally vertically disposed back wall panel 86 and a pair of spaced parallel vertical side wall panels 88 adjacent opposite ends thereof. A decorative connecting or joint member 90 is secured to each end of the back panel along its edge, for joining the side panels 88 thereto and also for joining additional modules. The connecting member includes an H-shaped central body defining oppositely facing channels 92 and 94. One channel 92 receives an edge of the back panel 86 therein, and the opposite channel 94 may receive the edge of a black panel of an adjoining unit. The connecting member is secured to the back panels by suitable means such as bolts 96.

The connecting member 90 also includes outwardly extending perpendicular flanges 98 and 100 on opposite sides thereof. A side panel 88 is secured to one flange 98 at each end of the back panel, by fastening means such as screws 102. One side panel 88 may be shared by two adjoining stands 12. The remaining flange 100 may be employed for erecting a side panel on the reverse side of the back panel, if desired, thus providing similar back-to-back displays. The back panel is surmounted by a decorative and functional top strip 104 and decorative caps 106 at opposite ends thereof. The top strip may be provided with ornamentation or with information, such as the composition of various sets of flatware.

The side panels 88 of the display stand are provided with forwardly and downwardly inclined upper edges 108. The display device 14 may be mounted on the side panels in the manner illustrated in FIGS. 2–4. The legs 26 and 28 are secured on the inner surfaces of the panels, with the frame 16 projected outwardly therefrom. In this manner, the frame slopes downwardly and forwardly, and the flatware pieces are displayed in the same posture. The frame may be mounted at various angles. The display stand is also adapted for mounting a second display device 14 on the side panels 88, below and forwardly of the illustrated device. The second device may be arranged at a different angle if desired. Alternatively, other types of racks may be mounted on the forward portions of the side panels, e.g., for holding sets of silverware conventionally arranged in trays or the like. Articles to be displayed may also be mounted on the counter top on which the display unit is disposed, between the side walls 88. Various display arrangements are possible, especially when several display units are employed together as modules to form an extended display.

The display device 14 is constructed for heightening the impression created by the flatware while minimizing the relative impact of the display mounting, in contrast to the prior recessed trays, holders, bins, and so forth. The open construction of the display device exposes the surface of the flatware nearly completely and draws attention thereto. The articles on display are projected or suspended outwardly from their mounting, to further highlight and focus attention on them. The display device may be coated or painted in manner which causes it to blend with the background provided by the display stand 12 or other base or support, to cooperate in causing the articles to stand out from their background.

The display device provides a means of enabling the prospective purchaser to select all or any part of a set of flatware. Sets for serving a small number of persons may be obtained directly from the display device. Sets for larger numbers of persons may be stored conveniently nearby, and several may also be placed on display in the vicinity of the display unit. Sales of individual pieces are stimulated, both at the time of purchasing a set and subsequently.

It will be apparent that various changes and modifications may be made in the construction and arrangement of the components of the display equipment while accomplishing the objects of the invention. Thus, for example, the holders for individual pieces may be constructed and mounted in equivalent other ways while providing the visual impact and other functions and advantages of the invention. Other leg means may be provided for mounting the holders on suitable bases or supports, so as to project the flatware being displayed outwardly to the viewer. These and other changes and modifications may be made within the spirit and scope of the invention, and it is intended that they be included within the scope of the appended claims.

We claim:

1. In flatware display equipment, means for supporting a plurality of flatware articles, and a plurality of pairs of narrow brackets disposed in spaced apart side-by-side relation on said supporting means for respectively holding individual flatware articles including forks and spoons of diverse sizes, said brackets in each pair being spaced apart for receiving the handle of a flatware article therebetween and extending laterally along the handle for aligning the articles received by the several pairs of brackets in side-by-side relation with the opposite ends of the articles projecting laterally beyond the brackets, said brackets in each pair extending outwardly for receiving a stack of pieces of one flatware article therebetween, whereby a plurality of stacks of flatware articles are projected outwardly from said supporting means for viewing with their tops and sides exposed to view from various directions, said brackets in each pair having end sections extending outwardly for abutting engagement with laterally projecting enlarged functional end portions of pieces of a flatware article stacked therebetween for aligning the pieces in the stack, said bracket end sections being disposed at corresponding ends of the several pairs of brackets for mounting the flatware articles with their functional ends substantially in adjacent side-by-side relation, said bracket end sections being staggered laterally with respect to each other for varying the dispositions of flatware articles of different types for display purposes.

2. In flatware display equipment, a base, means for supporting a plurality of flatware articles on said base substantially on a common inclined plane, a plurality of pairs of narrow brackets disposed in spaced apart side-by-side relation on said supporting means for respectively holding individual flatware articles including knives, forks and spoons of diverse sizes in upwardly extending inclined position, said brackets in each pair being spaced apart for receiving the handle of a flatware article therebetween and extending laterally along the handle for aligning the articles received by the several pairs of brackets in side-by-side relation with the opposite ends of the articles projecting laterally beyond the brackets, said brackets in each pair extending outwardly for receiving a stack of pieces of one flatware article therebetween, whereby a plurality of stacks of flatware articles are projected outwardly from said supporting means for viewing with their tops and sides exposed to view from various directions, said brackets in each certain pairs having upper end sections extending perpendicularly outwardly from said plane for abutting engagement with laterally projecting enlarged functional end portions of pieces of forks and spoons respectively stacked therebetween for gravity alignment of the pieces in the respective stacks with the functional ends of the several articles uppermost and substantially in adjacent side-by-side relation, said bracket end sections being staggered laterally with respect to each other for varying the dispositions of flatware articles of different types for display purposes, and retainers on said supporting means extending perpendicularly outwardly from said plane and spaced laterally beyond the lower ends of certain other bracket pairs for abutting engagement with the free ends of knife handles for gravity alignment of knives stacked between the brackets of each pair with their functional ends uppermost and substantially in adjacent side-by-side relation to the functional ends of the other articles.

3. In flatware display equipment, a pair of holder mounting rods disposed in spaced parallel relation in a common plane, and a plurality of bent holder rods extending between said mounting rods in spaced apart pairs in side-by-side relation for holding individual flatware articles including forks and spoons of diverse sizes by respective pairs, said holder rods being secured at their opposite ends to said mounting rods, said holder rods in each pair including bracket portions on the respective rods spaced apart for receiving the handle of a flatware article therebetween and extending laterally along the handle for aligning the articles received by the several pairs of holder rods in side-by-side relation with the opposite ends of the articles projecting laterally beyond the bracket portions, said bracket portions in each pair of holder rods extending outwardly for receiving a stack of pieces of one flatware article therebetween, said mounting rods and holder rods providing supports for said flatware article ends to support the articles substantially in parallel to said plane, whereby a plurality of stacks of flatware articles are projected outwardly from said plane for viewing with their tops and sides exposed to view from various directions, said bracket portions in each pair of holder rods having end sections extending perpendicularly outwardly from said plane for abutting engagement with laterally projecting enlarged functional end portions of pieces of a flatware article stacked therebetween for aligning the pieces in the stack, said bracket end sections being disposed at corresponding ends of the several pairs of brackets for mounting the flatware articles with their functional ends substantially in adjacent side-by-side relation, said bracket end sections being staggered laterally with respect to each other for varying the dispositions of flatware articles of different types for display purposes.

4. In flatware display equipment, a base, a generally flat frame including a mounting bar, a plurality of spaced apart cross rods mounted on said bar, and a pair of holder mounting rods mounted on said cross rods on opposite sides of said mounting bar in spaced parallel relation thereto, means mounting said mounting bar on said base with said frame inclined upwardly from one of said mounting rods to the other, a plurality of bent holder rods extending between said mounting rods in spaced apart pairs in side-by-side relation for holding individual flatware articles including knives, forks and spoons of diverse sizes by respective pairs in upwardly extending inclined positions, said holder rods being secured at their opposite ends to said mounting rods, said holder rods in each pair including bracket portions on the respective rods spaced apart for receiving the handle of a flatware article therebetween and extending laterally along the handle for aligning the articles received by the several pairs of holder rods in side-by-side relation with the opposite ends of the articles projecting laterally beyond the bracket portions, said bracket portions in each pair of holder rods extending outwardly for receiving a stack of pieces of one flatware article therebetween, said mounting rods and holder rods providing supports for said flatware article ends to support the articles substantially in parallel to said frame, whereby a plurality of stacks of flatware articles are projected outwardly from said frame for viewing with their tops and sides exposed to view from various directions, said bracket portions in each of certain pairs of holder rods having upper end sections extending perpendicularly outwardly from said frame for abutting engagement with laterally projecting enlarged functional end portions of pieces of forks and spoons respectively stacked therebetween for gravity alignment of the pieces in the respective stacks with the functional ends of the several articles uppermost and substantially in adjacent side-by-side relation, said bracket end sections being staggered laterally with respect to each other for varying the dispositions of flatware articles of different types for display purposes, and retainer bars mounted on said frame and extending perpendicularly outwardly therefrom and spaced laterally beyond the lower ends of the bracket portions of certain other holder rod pairs for abutting engagement with the free ends of knife handles for gravity alignment of knives stacked between the bracket portions of each pair with their functional ends uppermost and substantially in adjacent side-by-side relation to the functional ends of the other articles.

References Cited in the file of this patent

UNITED STATES PATENTS

| | | |
|---|---|---|
| D. 162,925 | Berkowitz | Apr. 17, 1951 |
| 917,643 | McGrath | Apr. 6, 1909 |
| 1,635,911 | Vegkley | July 12, 1927 |
| 1,900,053 | Glidden | Mar. 7, 1933 |
| 1,939,497 | Herring | Dec. 12, 1933 |
| 2,130,197 | Schick | Sept. 13, 1938 |
| 2,574,099 | Gessler | Nov. 6, 1951 |
| 2,829,852 | Smith et al. | Apr. 8, 1958 |